United States Patent
Lee et al.

(10) Patent No.: US 11,500,742 B2
(45) Date of Patent: Nov. 15, 2022

(54) ELECTRONIC DEVICE AND CONTROL METHOD THEREOF

(71) Applicant: SAMSUNG ELECTRONICS CO., LTD., Suwon-si (KR)

(72) Inventors: Hodong Lee, Suwon-si (KR); Kwanghyun Koh, Suwon-si (KR); Kiyoung Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

(21) Appl. No.: 16/768,741

(22) PCT Filed: Dec. 19, 2018

(86) PCT No.: PCT/KR2018/016173
§ 371 (c)(1),
(2) Date: Jun. 1, 2020

(87) PCT Pub. No.: WO2019/135511
PCT Pub. Date: Jul. 11, 2019

(65) Prior Publication Data
US 2021/0172838 A1    Jun. 10, 2021

(30) Foreign Application Priority Data

Jan. 8, 2018    (KR) .................. 10-2018-0002163

(51) Int. Cl.
*G06F 11/00*    (2006.01)
*G06F 11/16*    (2006.01)
(Continued)

(52) U.S. Cl.
CPC .......... *G06F 11/1629* (2013.01); *G06F 11/34* (2013.01); *G06F 11/3452* (2013.01); *G06F 17/18* (2013.01); *G01M 99/005* (2013.01)

(58) Field of Classification Search
CPC .. G01M 99/005; G06F 11/1629; G06F 11/34; G06F 11/3452; G06F 17/18; G06F 11/3409
(Continued)

(56) References Cited

U.S. PATENT DOCUMENTS 5,974,576 A * 10/1999 Zhu .................. G06F 11/076
714/704
7,900,095 B2 * 3/2011 Koguchi ............. G06F 11/1012
714/42
(Continued)

FOREIGN PATENT DOCUMENTS

JP    63-22107    5/1988
JP    2009-253638    10/2009
(Continued)

OTHER PUBLICATIONS

International Search Report for PCT/KR2018/016173 with English translation, dated Apr. 1, 2019, 4 pages.
(Continued)

*Primary Examiner* — Albert Decady
*Assistant Examiner* — Osman M Alshack
(74) *Attorney, Agent, or Firm* — Nixon & Vanderhye, PC

(57) ABSTRACT

An electronic apparatus is provided. The electronic apparatus includes a storage storing error-related information of an external electronic apparatus, and a processor configured to obtain first error-related information with respect to a target time interval and second error-related information with respect to a standard time interval including the target time interval and time intervals other than the target time interval, from the storage, obtain frequency information for each number of error occurrences with respect to the target time interval based on the first error-related information and frequency information for each number of error occurrences
(Continued)

with respect to the standard time interval based on the second error-related information, and compare the frequency information for each number of error occurrences with respect to the target time interval with the frequency information for each number of error occurrences with respect to the standard time interval to identify an error occurrence level with respect to the target time interval.

11 Claims, 6 Drawing Sheets

(51) Int. Cl.
*G06F 11/34* (2006.01)
*G06F 17/18* (2006.01)
*G01M 99/00* (2011.01)

(58) Field of Classification Search
USPC .......................................... 714/704, 705, 763
See application file for complete search history.

(56) References Cited

U.S. PATENT DOCUMENTS

| | | | | |
|---|---|---|---|---|
| 2004/0156285 | A1* | 8/2004 | Lee | G11B 19/26 369/47.48 |
| 2005/0278570 | A1* | 12/2005 | Jastad | G06F 11/008 714/25 |
| 2006/0031182 | A1* | 2/2006 | Ryan | G06N 5/04 706/50 |
| 2008/0005616 | A1* | 1/2008 | Barlow | G06F 12/0875 711/170 |
| 2008/0077825 | A1* | 3/2008 | Bello | G06F 11/0787 714/54 |
| 2008/0083029 | A1 | 4/2008 | Yeh et al. | |
| 2009/0183037 | A1* | 7/2009 | Hamaguchi | H04L 41/147 714/704 |
| 2009/0300433 | A1* | 12/2009 | Takeuchi | G06F 11/0781 714/49 |
| 2012/0089357 | A1 | 4/2012 | Lakshminarayan et al. | |
| 2013/0030761 | A1 | 1/2013 | Lakshminarayan et al. | |
| 2013/0110761 | A1 | 5/2013 | Viswanathan et al. | |
| 2013/0227224 | A1* | 8/2013 | Koinuma | G06F 11/1048 711/E12.091 |
| 2014/0331109 | A1* | 11/2014 | Wakuda | H04L 1/24 714/799 |
| 2015/0100837 | A1* | 4/2015 | Ku | G11C 29/4401 714/710 |
| 2015/0207711 | A1 | 7/2015 | Le Merrer et al. | |
| 2015/0351701 | A1 | 12/2015 | Moxon et al. | |
| 2015/0363699 | A1 | 12/2015 | Nikovski et al. | |
| 2016/0334776 | A1* | 11/2016 | Hanaki | G05B 19/058 |

FOREIGN PATENT DOCUMENTS

| | | |
|---|---|---|
| JP | 2016-223904 | 12/2016 |
| KR | 10-1323074 | 10/2013 |
| KR | 10-2014-0077654 | 6/2014 |
| KR | 10-2015-0031470 | 3/2015 |
| KR | 10-1758356 | 7/2017 |

OTHER PUBLICATIONS

Written Opinion of the ISA for PCT/KR2018/016173 with English translation, dated Apr. 1, 2019, 7 pages.
Notice of Allowance dated Apr. 14, 2022 in counterpart Korean Patent Application No. 10-2018-0002163 and English-language translation.

* cited by examiner

ELECTRONIC DEVICE AND CONTROL METHOD THEREOF

This application is the U.S. national phase of International Application No. PCT/KR2018/016173 filed 19 Dec. 2018, which designated the U.S. and claims priority to KR Patent Application No. 10-2018-0002163 filed 8 Jan. 2018, the entire contents of each of which are hereby incorporated by reference.

FIELD

The disclosure relates to an electronic apparatus that identifies an error occurred in an external electronic apparatus and a control method thereof.

DESCRIPTION OF RELATED ART

A data analysis method using average values and parametric characteristics is a method used when a distribution form of the data corresponds to a normal distribution, which is called a parametric method in statistics.

However, the parametric method cannot be applied to a data group which is not evenly distributed around the average value, that is, a data group which does not have a normal distribution.

Data related to error information does not follow the normal distribution, and thus, the system, in the prior art, for analyzing information related to an error occurred during an operation of an electronic apparatus simply sums the number of errors occurred during a specific time. In other words, since a standard value does not exist in analyzing information on errors occurred during the operation of the electronic apparatus, it was impossible to accurately catch the error distribution occurred in the electronic apparatus by the parametric method.

SUMMARY

The disclosure is to obtain error information generated from an external electronic apparatus and apply a non-parametric verification to the obtained information to provide an electronic apparatus capable of identifying error occurrence and a control method thereof.

An electronic apparatus according to an embodiment of the disclosure includes a storage storing error-related information of an external electronic apparatus, and a processor configured to obtain first error-related information with respect to a target time interval and second error-related information with respect to a standard time interval including the target time interval and time intervals other than the target time interval, from the storage, obtain frequency information for each number of error occurrences with respect to the target time interval based on the first error-related information and frequency information for each number of error occurrences with respect to the standard time interval based on the second error-related information, and compare the frequency information for each number of error occurrences with respect to the target time interval with the frequency information for each number of error occurrences with respect to the standard time interval to identify an error occurrence level with respect to the target time interval.

The processor may be configured to, based on the frequency information for each number of error occurrences with respect to the target time interval and the frequency information for each number of error occurrences with respect to the standard time interval, obtain a similarity between an error occurrence distribution in the target time interval and an error occurrence distribution in the standard time interval, and identify the error occurrence level based on the obtained similarity.

The processor may be configured to identify the target time interval and the standard time interval by a unit of a predetermined time, respectively, and identify the number of error occurrences in each time unit to obtain information on frequency information for each number of error occurrences in the target time interval and in the standard time interval, respectively.

The processor may be configured to, based on the obtained similarity being equal to or greater than a predetermined first threshold value, identify the error occurrence level as a stable level, based on the obtained similarity being less than the first threshold value and being equal to or greater than a second threshold value, identify the error occurrence level as a first warning level, and based on the obtained similarity being less than the second threshold value, identify the error occurrence level as a second warning level higher than the first warning level.

The processor may be configured to apply a predetermined algorithm to the frequency information for each number of error occurrences with respect to the target time interval and the frequency information for each number of error occurrences with respect to the standard time interval, and obtain a similarity between the error occurrence distribution in the target time interval and the error occurrence distribution in the standard time interval.

The predetermined algorithm may be at least one of Mann-Whitney test and Kruskal-Wallis test.

The apparatus may further include a communicator.

The processor is configured to provide feedback information with respect to the obtained error occurrence level to the external electronic apparatus through the communicator.

The feedback information with respect to the obtained error occurrence level may include at least one of information on the target time interval, the error occurrence level in the target time interval, and hardware or software related to the error occurrence level.

A control method of an electronic apparatus according to an embodiment of the disclosure includes obtaining first error-related information with respect to a target time interval and second error-related information with respect to a standard time interval including the target time interval and time intervals other than the target time interval, from error-related information of an external electronic apparatus, obtaining frequency information for each number of error occurrences with respect to the target time interval based on the first error-related information and frequency information for each number of error occurrences with respect to the standard time interval based on the second error-related information, and comparing the frequency information for each number of error occurrences with respect to the target time interval with the frequency information for each number of error occurrences with respect to the standard time interval to identify an error occurrence level with respect to the target time interval.

The identifying the error occurrence level may include obtaining a similarity between an error occurrence distribution in the target time interval and an error occurrence distribution in the standard time interval based on the frequency information for each number of error occurrences with respect to the target time interval and the frequency information for each number of error occurrences with respect to the standard time interval, and identifying the error occurrence level based on the obtained similarity.

The obtaining the frequency information may include identifying the target time interval and the standard time interval by a unit of a predetermined time, respectively, and identifying the number of error occurrences in each time unit to obtain information on frequency information for each number of error occurrences in the target time interval and in the standard time interval, respectively.

The identifying the error occurrence level may include, based on the obtained similarity being equal to or greater than a predetermined first threshold value, identifying the error occurrence level as a stable level, based on the obtained similarity being less than the first threshold value and being equal to or greater than a second threshold value, identifying the error occurrence level as a first warning level, and based on the obtained similarity being less than the second threshold value, identifying the error occurrence level as a second warning level higher than the first warning level.

The identifying the error occurrence level may further include applying a predetermined algorithm to the frequency information for each number of error occurrences with respect to the target time interval and the frequency information for each number of error occurrences with respect to the standard time interval, and obtaining a similarity between the error occurrence distribution in the target time interval and the error occurrence distribution in the standard time interval.

The predetermined algorithm may be at least one of Mann-Whitney test and Kruskal-Wallis test.

The method may further include providing feedback information with respect to the obtained error occurrence level to the external electronic apparatus.

The feedback information with respect to the error occurrence level may include at least one of information on the target time interval, the error occurrence level in the target time interval, and hardware or software related to the error occurrence level.

According to an embodiment of the disclosure, a non-transitory computer-readable medium storing computer instructions that cause the electronic apparatus to perform an operation, when executed by a processor of the electronic apparatus, the operation may include obtaining first error-related information with respect to a target time interval and second error-related information with respect to a standard time interval including the target time interval and time intervals other than the target time interval, from error-related information of an external electronic apparatus, obtaining frequency information for each number of error occurrences with respect to the target time interval based on the first error-related information and frequency information for each number of error occurrences with respect to the standard time interval based on the second error-related information, and comparing the frequency information for each number of error occurrences with respect to the target time interval with the frequency information for each number of error occurrences with respect to the standard time interval to identify an error occurrence level with respect to the target time interval.

As described above, according to various embodiments of the disclosure, an error occurrence level in an external electronic apparatus may be accurately caught by applying non-parametric verification, so that the error problem occurred in the external electronic apparatus may be quickly solved.

DETAILED DESCRIPTION OF EXAMPLE EMBODIMENTS

Figure 1:
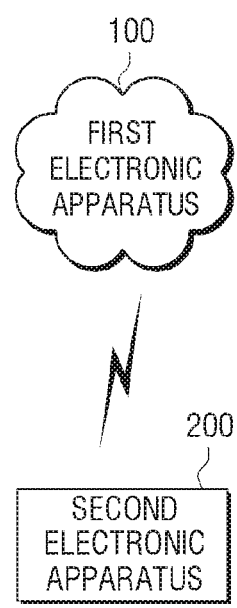
FIG. 1 is a mimetic diagram illustrating a display system according to an embodiment of the disclosure.

Below, exemplary embodiments will be described in detail with standard to the accompanying drawings. In describing embodiments, detailed description of relevant known functions or components may be omitted if it would obscure the description of the subject matter. In addition, the embodiments may be changed in various forms, and therefore, the technical scope is not limited to the following embodiments. Rather, these embodiments are provided to make the disclosure thorough and complete.

Unless explicitly described otherwise, the term 'including' will be understood to imply the inclusion of a component, but not the exclusion of any other components. Further, various elements and areas in the drawings are schematically drawn. Therefore, the technical ideas are not limited by a relative size or interval drawn in the accompanying drawings.

The expression 'at least one of A, B and C' may mean 'A', 'B', 'C', 'A and B', 'A and C', 'B and C' or 'A, B and C'.

Hereinafter, the invention will be described in detail with standard to the attached drawings.

FIG. 1 is a mimetic diagram illustrating a display system according to an embodiment of the disclosure.

Referring to FIG. 1, the display system 10 according to an embodiment of the disclosure includes a first electronic apparatus 100 and a second electronic apparatus 200.

The first electronic apparatus 100 may be implemented as a server that receives information from the second electronic apparatus 200. The first electronic apparatus 100 may be implemented as a PC having a built-in program capable of executing various embodiments according to various embodiments of the disclosure, but is not limited thereto, and may be implemented as a laptop computer, a tablet, a smartphone, or the like.

The second electronic apparatus 200 is a general device in which an error occurs and may be implemented as a mobile phone such as a smartphone, but is not limited thereto if is a device capable of transmitting information to the first electronic apparatus 100. For example, the second electronic apparatus 200 may be implemented as various types of home appliances such as a TV, a tablet, a laptop computer, an Internet-based washing machine, refrigerator, and air conditioner, or the like.

Data in the form of normal distribution in which information is evenly distributed around the average value analyzes data with the parametric verification method, whereas data related to errors occurred in the electronic apparatus does not have the form of normal distribution and cannot analyze data with the parametric verification since there is no standard information such as an average value.

Accordingly, according to an embodiment of the disclosure, an error-related data occurred in the electronic apparatus may be analyzed by a method of non-parametric verification. Hereinafter, various embodiments of the disclosure will be described in detail with standard to the drawings.

Figure 2:
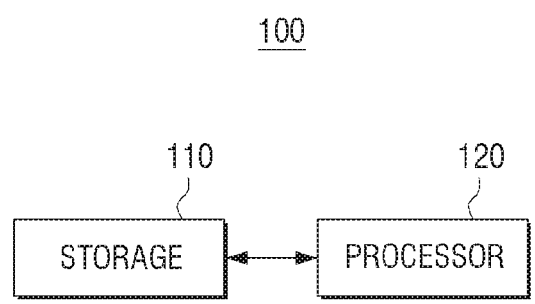
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

According to FIG. 2, the electronic apparatus 100 includes a storage 110 and a processor 120.

The storage 110 may store various data, programs or applications for driving and controlling the electronic apparatus 100. The storage 110 may store a control program for controlling the electronic apparatus 100 and the processor 120, an application firstly provided from a manufacturing company or downloaded from an external source, databases, or related data.

Specifically, the storage 110 may store error-related information of an external electronic apparatus 200. The error-related information of the external electronic apparatus 200 may include information on the time an error occurred in the external electronic apparatus 200, information on the number of error occurrences, information on the location where the error occurred, or the like. The information on the location where the error occurred may be, for example, identification information of specific hardware or specific software included in the external electronic apparatus 200.

The processor 120 may control the overall operation of the electronic apparatus 100.

According to an embodiment, the processor 120 may be implemented as a digital signal processor (DSP), a microprocessor, or a time controller (TCON) that processes digital signals, but is not limited thereto. Also, the processor may include one or more of central processing unit (CPU), micro controller unit (MCU), micro processing unit (MPU), controller, application processor (AP), or communication processor (CP), an ARM processor, or may be defined as the corresponding term. In addition, the processor 120 may be implemented as a system on chip (SoC), a large scale integration (LSI) with a built-in processing algorithm, or may be implemented in the form of a field programmable gate array (FPGA).

The processor 120 may obtain first error-related information with respect to a target time interval and second error-related information with respect to a standard time interval including a target time interval and a time interval other than the target time interval from the storage 110.

The error-related information may include information on the time the error occurred in the external electronic apparatus 200, information on the number of error occurrences, information on the location where the error occurred, or the like. The information on the location where the error occurred may be, for example, specific hardware or specific software.

The target time interval means a target interval for identifying an error occurrence level, and may be set based on user input, characteristics of each element (e.g., hardware, software, components, etc.) constituting the external electronic apparatus 200, usage history of the electronic apparatus 200.

The standard time interval is a standard interval for identifying an error occurrence level in the target time interval. The standard time interval is a relatively long time interval compared to the target time interval because it includes at least the target time interval and further includes other times. During the target time interval, an abnormally high frequency error may occur in the electronic apparatus 100, but the error distribution in the standard time interval longer than the target time interval may indicate a relatively common error distribution, such that the standard time interval including the target time interval may be a standard for identifying an error occurrence level of the target time interval. In other words, since the error distribution in the standard time interval is similar to the error distribution in a relatively general electronic apparatus compared to the error distribution in the target time interval, the standard time interval may be a standard for identifying the error occurrence level of the target time interval.

For example, if the target time interval is from 16:00 to 17:00 on Oct. 20, 2017, the standard time interval for the target interval may be from 16:00 to 17:00 on Oct. 20, 2017.

However, an interval of the standard time interval is not limited to 1 hour, and may be variously set, such as 5 hours, 1 day, 30 days, and a plurality of standard time intervals may be set for one target time interval. Information on the normal distribution form may analyze based on the average value, but the information on the error occurred in the external electronic apparatus 200 according to the disclosure is not the information of the normal distribution form. Therefore, the standard time interval may be used as a standard value for the target time interval instead of the average value.

The processor 120 may obtain frequency information for each number of error occurrences with respect to the target time interval based on the first error-related information, and obtain frequency information for each number of error occurrences with respect to the target time interval based on the second error-related information.

The processor 120 may receive information on time an error occurred and information on a location where the error occurred from the external electronic apparatus 200. The processor 120 may convert each of the received first error-related information and second error-related information into frequency information for each number of error occurrences to obtain the information. According to an embodiment of the disclosure, the processor 120 may identify each of the target time interval and the standard time interval in a predetermined time unit, and identify the number of error occurrences in each time unit to obtain frequency information for each number of error occurrences in the target time interval and in the standard time interval.

For example, it is assumed that the target time interval is from 16:50 to 17:00 on Oct. 20, 2017, the target time interval is 10 minutes, and the predetermined time unit is 1 minute. The processor 120 may divide the target time interval into 10 intervals of 1 minute and obtain the number of error occurrences every minute. For example, during one minute, there may be no error occurred more than five times, there may be one-time an error occurred four times, there may be one-time an error occurred three times, there may be two times an error occurred two times, there may be two times an error occurred one time, and there may be four times no error occurred. In this way, the processor 120 may obtain frequency information for each number of error occurrences based on error-related information received from the external electronic apparatus 200.

The processor 120 may compare frequency information for each number of error occurrences with respect to the target time interval and frequency information for each number of error occurrences with respect to the standard time interval, and identify an error occurrence level with respect to the target time interval.

According to an embodiment of the disclosure, the processor 120 may obtain a similarity between an error occurrence distribution in the target time interval and an error occurrence distribution in the target time interval based on the frequency information for each number of error occurrences with respect to the target time interval and the frequency information for each number of error occurrences with respect to the standard time interval, and identify the error occurrence level based on the obtained similarity.

The standard time interval is a standard interval for identifying an error occurrence level in the target time interval of the external electronic apparatus 200, and includes the target time interval and intervals other than the target time interval. Accordingly, the error distribution in the standard time interval may be similar to the error distribution in the electronic apparatus, which is relatively general, compared to the error distribution in the target time interval. For example, the error distribution in 1 day, which is an interval of the standard time interval, may be similar to the error distribution of a relatively general electronic apparatus, rather than 10 minutes, which is an interval of the target time interval.

Accordingly, the processor 120 may identify the target time interval is similar to standard information as the error occurrence distribution of the standard time interval, which is standard information with respect to the error distribution, is similar to the error occurrence distribution of the target time interval. In other words, if the error occurrence distribution in the target time interval and the error occurrence distribution in the standard time interval are similar, the processor 120 may identify the error occurrence level in the target time interval as a stable level, and if the error occurrence distribution in the target time interval and the error occurrence distribution in the standard time interval are different, the processor 120 may identify the error occurrence level of the target time interval as an unstable warning level. The processor 120 may apply a predetermined algorithm to obtain a similarity between the error occurrence distribution in the target time interval and the error occurrence distribution in the standard time interval, which will be described below.

According to an embodiment of the disclosure, if the obtained similarity is equal to or greater than a predetermined first threshold value, the processor 120 may identify that the error occurrence level is stable, and if the obtained similarity is less than the first threshold and is greater than or equal to a second threshold value, the processor 120 may identify that the error occurrence level is a first warning level, and if the obtained similarity is less than the second threshold value, the processor 120 may identify that the error occurrence level is a second warning level higher than the first warning level.

The first threshold value and the second threshold value may be adjusted to adjust a sensitivity with respect to the error occurrence level, and the number of threshold values may be increased to further subdivide the error occurrence level. For example, if the first threshold value is set low, the error occurrence level may be increased to be identified as a stable level, and thus the sensitivity with respect to the error occurrence level may decrease. If the second threshold value is set high, the error occurrence level may be increased to be identified as a warning level, and thus the sensitivity with respect to the error occurrence level may increase The processor 120 may apply a predetermined algorithm to the frequency information for each number of error occurrences with respect to the target time interval and the frequency information for each number of error occurrences with respect to the standard time interval in order to obtain a similarity between the error occurrence distribution in the target time interval and the error occurrence distribution in the standard time interval. The predetermined algorithm may be at least one of the Mann-Whitney test and the Kruskal-Wallis test.

The frequency information for each number of error occurrences is not a shape that data is spread evenly around the average value, which means it does not correspond to the normal distribution shape, such that the parametric test method using an average value may not be applied. Since a situation that fewer errors are occurred is relatively frequent, the distribution related to the frequency for each number of error occurrences may generally require nonparametric verification that the frequency increases as the frequency of error occurrence gets closure to 0, that is, which does not follow the normal distribution since a graph of the error occurrence distribution tends to be 0. Representative algorithms for the nonparametric verification include the Mann-Whitney test algorithm and the Kruskal-Wallis test. Since the Mann-Whitney test algorithm and the Kruskal-Wallis test are prior art, detailed description will be omitted. The processor 120 may identify an error occurrence level in the target time interval based the obtained similarity between the error occurrence distribution in the target time interval and the error occurrence distribution in the standard time interval.

The processor 120 may provide feedback information on the obtained error occurrence level to the external electronic apparatus 200 through a communicator (not illustrated). The feedback information on the error occurrence level may include at least one of information on a target time interval, an error occurrence level in the target time interval, and hardware or software related to the error occurrence level. When the external electronic apparatus 200 includes a display (not illustrated), feedback information on the error occurrence level may be provided on the display in the form of a specific mesh or an image. Alternatively, the feedback information may be in the form of outputting a specific sound or voice, or may be in the form of vibrating the external electronic apparatus 200. Accordingly, the user of the external electronic apparatus 200 may recognize that there is a problem in the external electronic apparatus 200.

According to another embodiment of the disclosure, a processor (not illustrated) of the external electronic apparatus 200 may obtain information on an error occurred in the external electronic apparatus 200 and directly identify an error occurrence level for the target time interval. In other words, the processor (not illustrated) of the external electronic apparatus 200 may obtain information on a first error-related information with respect to the target time interval and a second error-related information with respect to the standard time interval including the target time interval and time intervals other than the target time interval, obtain frequency information for each number of error occurrences with respect to the target time interval based on the first error-related information, obtain frequency information for each number of error occurrences with respect to the standard time interval based on the second error-related information, compare frequency information for each number of error occurrences with respect to the target time interval with frequency information for each number of error occurrences with respect to the standard time interval to identify an error occurrence level with respect to the target time interval. Since a specific operation of the processor of the external electronic apparatus 200 is the same as that of the processor 120 of the electronic apparatus 100, detailed descriptions thereof will be omitted.

Figure 3:
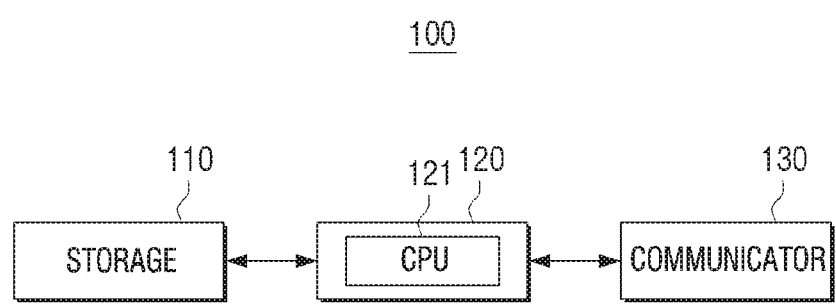
FIG. 3 is a block diagram illustrating an example of a detailed configuration of an electronic apparatus of FIG. 2.

FIG. 3 is a block diagram illustrating an example of a detailed configuration of an electronic apparatus of FIG. 2.

Referring to FIG. 3, the electronic apparatus 100 includes a storage 110, a processor 120 and a communicator 130.

The storage 110 may be implemented as internal memory such as a ROM, RAM, or the like included in the processor 120 or may be implemented as a memory separate from the processor 120. The storage 110 may be implemented in the form of a memory embedded in the electronic apparatus 100 according to a data storage purpose, or may be implemented in a form of a memory detachable from the electronic apparatus 100. For example, data for driving the electronic apparatus 100 may be stored in the memory embedded in the electronic apparatus 100, and data for extending the electronic apparatus 100 may be stored in the memory detachable from the electronic apparatus 100. Meanwhile, the memory embedded in the electronic apparatus 100 may be implemented in the form of the non-volatile memory, the volatile memory, a hard disk drive (HDD), a solid state drive (SSD), or the like.

The processor 120 may include a ROM (or non-volatile memory) in which a control program for controlling the electronic apparatus 100 is stored and a RAM (or volatile memory) used to store data input from outside of the electronic apparatus 100 or used as a storage area corresponding to various operations performed in the electronic apparatus 100.

The processor 120 may execute an operating system (OS), programs, and various applications stored in the storage 110 when a predetermined event occurs. The processor 120 may include a single core, a dual core, a triple core, a quad core, and core of a multiple thereof.

The CPU 121 may access the storage 110 to perform a booting sequence using an operating system (OS) stored in the storage 110. In addition, the CPU 121 may perform various operations using various programs, content, data, etc. which are stored in the storage 110.

The communicator 130 performs communications with the external electronic apparatus 200. Information on an error occurred from the external electronic apparatus 200 may be received by the electronic apparatus 100 through the communicator 130, and the electronic apparatus 100 may provide feedback information on the error occurrence level through the communicator 130.

The communicator 130 may perform wireless-communication with the external electronic apparatus 200 according to various communication methods such as Bluetooth (BT), Wireless Fidelity (WI-FI), Zigbee, Infrared (IR), and may perform communication with the external electronic apparatus 200 through various communication methods such as serial interface, universal serial bus (USB), near field communication (NFC), or the like.

Specifically, when a predetermined event occurs, the communicator 130 may operate in an interoperation state by performing communication with the external electronic apparatus 200 according to a predefined communication method. Herein, the interoperation may indicate every state in which the communication is available, including, for example, operation to initialize the communication between the electronic apparatus 100 and the external electronic apparatus 200, operation to form the network, operation to perform the device pairing, and so on. For example, device identification information of the external electronic apparatus 200 may be provided to the electronic apparatus 100. As a result, a pairing process between two apparatuses may be performed. For example, when a predetermined event occurs in the electronic apparatus 100 or the external electronic apparatus 200, the interoperation state may be implemented by searching surrounded devices and performing the pairing with the searched device through Digital Living Network Alliance (DLNA).

Figure 4:
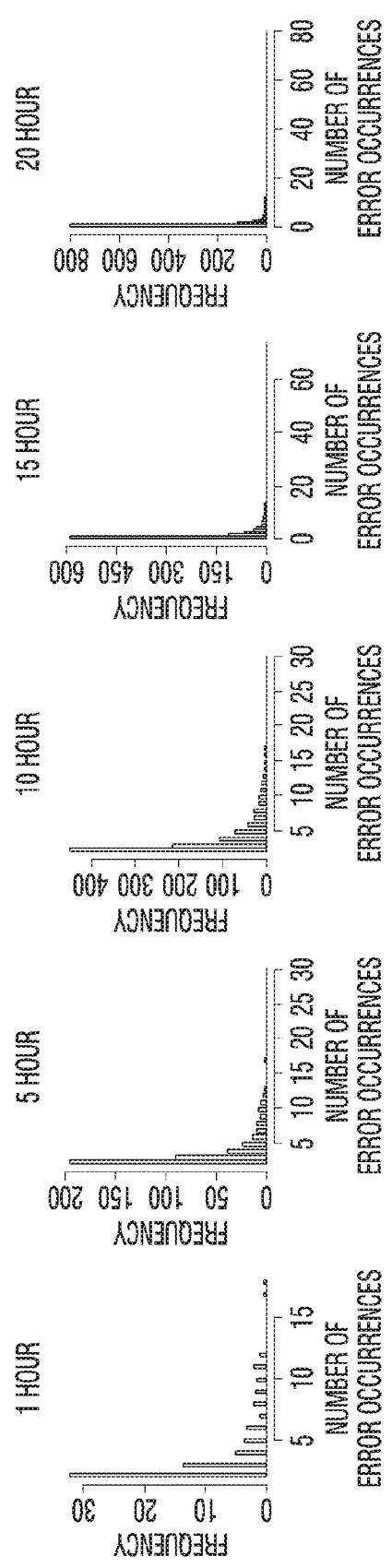
FIG. 4 is a view illustrating frequency information for each number of error occurrences according to an embodiment of the disclosure.

FIG. 4 is a view illustrating frequency information for each number of error occurrences according to an embodiment of the disclosure.

FIG. 4 illustrates frequency information for each number of error occurrences with respect to different standard time intervals.

Figure 5:
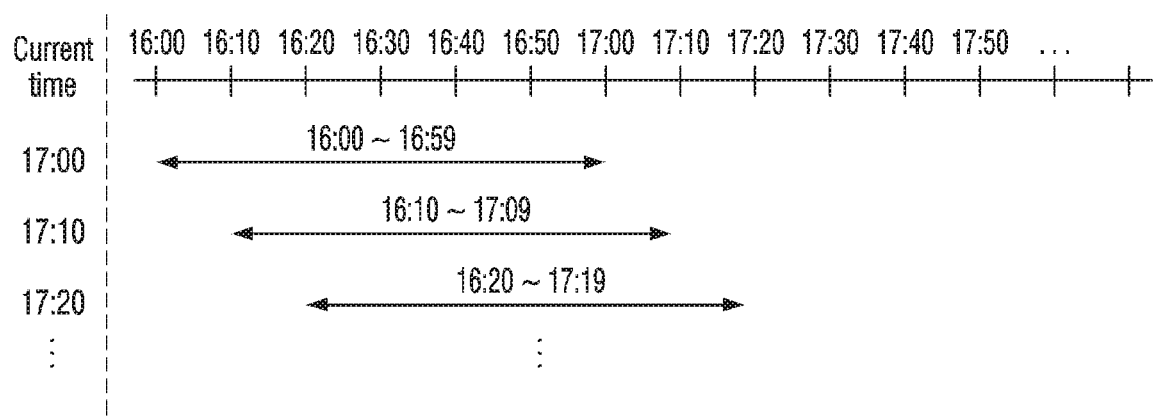
FIG. 5 is a view illustrating an error occurrence level of a target time interval in real time by changing a standard time interval according to an embodiment of the disclosure.

The interval of the standard time interval is 1 hour in FIG. 4A, 5 hours in FIG. 4B, 10 hours in FIG. 4C, 15 hours in FIG. 4D, and 20 hours in FIG. 4E. In each figure, the horizontal axis represents the number of error occurrences, and the vertical axis represents frequency. In other words, each figure represents information on frequency information for each number of error occurrences. According to an embodiment of the disclosure, the electronic apparatus 100 may identify each of the standard time intervals as a predetermined time unit and identify the number of error occurrences in each time unit, thereby obtaining frequency information for each number of error occurrences in the target time interval and the standard time interval, respectively.

For example, each figure of FIG. 4 may be a figure indicating that the predetermined time is 1 minute and frequency information for each number of errors occurred every 1 minute. As an example, the standard time interval is Oct. 20, 2017 from 16:00 to 17:00, so the standard time interval may be 1 hour and the predetermined time unit may be 1 minute. The first electronic apparatus 100 may obtain the number of errors occurred every 1 minute in the standard time interval.

According to an embodiment of the disclosure, a plurality of standard time intervals may be set with respect to one target time interval. For example, the target time interval is from 16:50 to 17:00 on Oct. 20, 2017, the interval of the target time interval is 10 minutes, and the interval of the standard time interval corresponding to the target time interval may be a plurality of standard time intervals such as 1 hour, 5 hours, 10 hours, 15 hours, and 20 hours, as illustrated in each figure of FIG. 4. As an example, the standard time interval according to FIG. 4A may be from 16:00 to 17:00 on Oct. 20, 2017, the standard time interval according to FIG. 4B may be from 12:00 to 17:00 on Oct. 20, 2017, the standard time interval according to FIG. 4C. may be from 7:00 to 17:00 on Oct. 20, 2017, the standard time interval according to FIG. 4D may be from 2:00 to 17:00 on Oct. 20, 2017, and the standard time interval according to FIG. 4E may be from 21:00 on Oct. 19, 2017 to 17:00 on Oct. 20, 2017. The first electronic apparatus 100 may compare the error occurrence distribution in one target time interval and the error occurrence distribution in a plurality of standard time intervals to obtain similarities in one target time interval and each standard time interval, respectively. In other words, the first electronic apparatus 100 may identify the error occurrence level in the target time interval by varying a standard value that is the standard for identifying the error occurrence level, although the target time interval that is the target of the error occurrence level is the same. Accordingly, when the interval of the standard time interval is 20 hours, the error occurrence level was a stable level, but when the interval of the standard time interval is 1 hour, the error occurrence level may be identified as a warning level. In this case, the user may choose whether to identify the error occurrence level with respect to the target time interval based on a relatively short time or the error occurrence level with respect to the target time interval based on a relatively long time.

FIG. 5 is a view illustrating an error occurrence level of a target time interval in real time by changing a standard time interval according to an embodiment of the disclosure.

The first electronic apparatus according to an embodiment of the disclosure may identify an error occurrence level of the second electronic apparatus in real time.

In real time, the first electronic apparatus may obtain information on the standard time interval measured every predetermined time to identify an error occurrence level of the second electronic apparatus.

According to FIG. 5, the interval of the standard time interval is set to 1 hour, and the interval of the standard time interval may be changed every 10 minutes according to the current time. For example, when the current time is 17:00, the first electronic apparatus may obtain information related to an error occurred in the second electronic apparatus in a target time interval from 16:50 to 17:00, and obtain frequency information for each number of error occurrences based on the obtained information. Also, the first electronic apparatus may obtain information related to an error occurred in the second electronic apparatus in a standard time interval from 16:00 to 17:00, and obtain frequency information for each number of error occurrences based on the obtained information. The first electronic apparatus may compare the frequency information for each number of error occurrences with respect to the target time interval and the frequency information for each number of error occurrences with respect to the standard time interval to identify the error occurrence level in the target time interval from 16:50 to 17:00.

Thereafter, when the current time is 17:10, the first electronic apparatus may obtain information related to an error occurred in the second electronic apparatus in the target time interval from 17:00 to 17:10 and obtain frequency information for each number of error occurrences based on the obtained information. Also, the first electronic apparatus may obtain information related to an error occurred in the second electronic apparatus in a standard time interval from 16:10 to 17:10, and obtain frequency information for each number of error occurrences based on the obtained information. The first electronic apparatus may compare the frequency information for each number of error occurrences with respect to the target time interval and the frequency information for each number of error occurrences with respect to the standard time interval to identify the error occurrence level in the target time interval from 17:00 to 17:10.

The first electronic apparatus has specifically described how to identify the error occurrence levels by comparing the frequency information for each number of error occurrences with respect to the target time interval and the frequency information for each number of error occurrences with respect to the standard time interval, so regarding this will be omitted.

The first electronic apparatus may identify the error occurrence levels in the target time interval of the second electronic apparatus in real time in the method described above.

Figure 6:
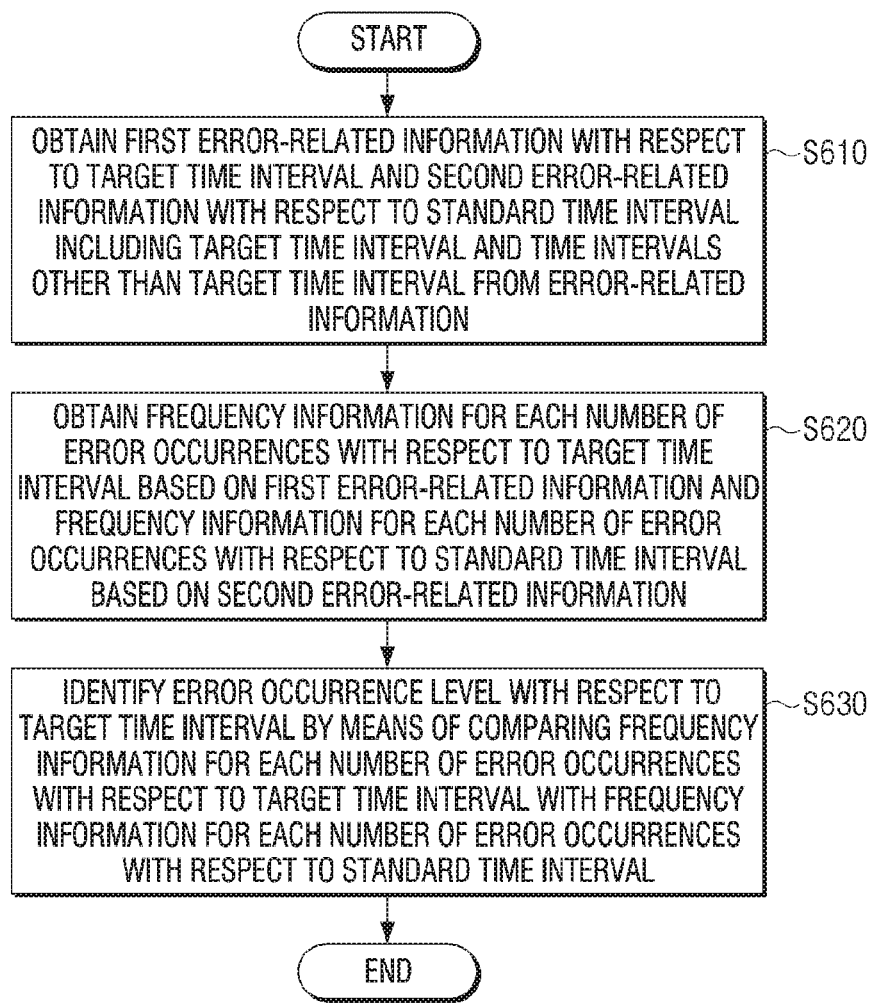
FIG. 6 is a flowchart illustrating a control method of an electronic apparatus according to an embodiment of the disclosure.

FIG. 6 is a flowchart illustrating a control method of an electronic apparatus according to an embodiment of the disclosure.

According to FIG. 6, the first electronic apparatus may obtain first error-related information with respect to a target time interval and second error-related information with respect to a standard time interval including the target time interval and time intervals other than the target time interval from error-related information of the second electronic apparatus (S610).

The first electronic apparatus may obtain frequency information for each number of error occurrences with respect to the target time interval based on the first error-related information, and may obtain frequency information for each number of error occurrences with respect to the standard time interval based on the second error-related information (S620).

The first electronic apparatus may identify the target time interval and the standard time interval in a predetermined time unit, respectively, and identify the number of error occurrences in each time unit to obtain frequency information for each number of error occurrences in the target time interval and the standard time interval, respectively. For example, the first electronic apparatus may identify the number of errors occurred for one minute in the target time interval and the standard time interval, respectively, and obtain frequency information for each number of error occurrences.

The first electronic apparatus may identify an error occurrence level with respect to the target time interval by comparing the frequency information for each number of error occurrences with respect to the target time interval and the frequency information for each number of error occurrences with respect to the standard time interval (S630).

Based on the frequency information for each number of error occurrences with respect to the target time interval and the frequency information for each number of error occurrences with respect to the standard time interval, the first electronic apparatus may obtain a similarity between an error occurrence distribution in the target time interval and an error occurrence distribution in the standard time interval, and identify the error occurrence level based on the obtained similarity.

When the obtained similarity is greater than or equal to a first predetermined threshold value, the first electronic apparatus may identify that the error occurrence level is a stable level, and when the obtained similarity is less than a first threshold value and is greater than or equal to a second threshold value, the first electronic apparatus may identify that the error occurrence level is a first warning level, and when the obtained similarity is less than the second threshold value, the first electronic apparatus may identify that the error occurrence level is a second warning level higher than the first warning level.

The first electronic apparatus may apply a predetermined algorithm to the frequency information for each number of error occurrences with respect to the target time interval and the frequency information for each number of error occurrences with respect to the standard time interval to obtain a similarity between the error occurrence distribution in the target time interval and the error occurrence distribution in the standard time interval. Herein, the predetermined algorithm may be at least one of the Mann-Whitney test and the Kruskal-Wallis test.

The first electronic apparatus may provide feedback information on the obtained error occurrence level to the second electronic apparatus, but is not limited thereto, and the first electronic apparatus may provide feedback information on the obtained error occurrence level to a developer or quality manager of the second electronic apparatus.

The feedback information on the error occurrence level may include at least one of information on the target time interval, the error occurrence level in the target time interval, and hardware or software related to the error occurrence level.

Detailed operations of each operation have been described above, so a detailed description thereof will be omitted.

Meanwhile, at least some configurations of the methods according to various embodiments of the disclosure described above may be implemented in an application form that can be installed in an existing electronic apparatus.

Further, at least some configurations of the methods according to various embodiments of the disclosure may be implemented by upgrading software or hardware of the existing electronic apparatus.

The above-described embodiments may be executed through an embedded server in the electronic apparatus or through an external server outside the electronic apparatus.

Various exemplary embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. Computer instructions stored in the non-transitory computer-readable medium may cause a specific device, when executed by a processor, to perform a processing operation according to the above-described various embodiments.

Methods of controlling a display apparatus according to various exemplary embodiments may be stored on a non-transitory readable medium. Computer instructions stored in the non-transitory computer-readable medium may cause a specific device, when executed by a processor, to perform a processing operation according to the above-described various embodiments.

When executed by the processor of the first electronic apparatus, the operation of the non-transitory computer-readable medium storing computer instructions for causing the first electronic apparatus to perform an operation may include the first error-related information with respect to the target time interval and the second error-related information with respect to the standard time interval including the target time interval and time intervals other than the target time interval, include the frequency information for each number of error occurrences with respect to the target time interval based on the first error-related information, and the frequency information for each number of error occurrences with respect to the standard time interval based on the second error-related information, and identify the error occurrence level with respect to the target time interval by comparing the frequency information for each number of error occurrences with respect to the target time interval and the frequency information for each number of error occurrences with respect to the standard time interval.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
a storage configured to store first error-related information of an external electronic apparatus and second error-related information of the external electronic apparatus; and
a processor configured to obtain, from the storage, the first error-related information with respect to a target time interval and the second error-related information with respect to a standard time interval that is longer than the target time interval, the standard time interval including the target time interval and a time interval adjacent to the target time interval,
obtain frequency information for each number of error occurrences with respect to the target time interval based on the first error-related information and frequency information for each number of error occurrences with respect to the standard time interval based on the second error-related information, and
identify an error occurrence level with respect to the target time interval by comparing the frequency information for each number of error occurrences with respect to the target time interval with the frequency information for each number of error occurrences with respect to the standard time interval,
wherein the processor is configured to, based on the frequency information for each number of error occurrences with respect to the target time interval and the frequency information for each number of error occurrences with respect to the standard time interval, obtain a similarity between an error occurrence distribution in the target time interval and an error occurrence distribution in the standard time interval, and identify the error occurrence level based on the obtained similarity, and
wherein the processor is configured to, based on the obtained similarity being equal to or greater than a first threshold value, identify the error occurrence level as a stable level, based on the obtained similarity being less than the first threshold value and being equal to or greater than a second threshold value, identify the error occurrence level as a first warning level, and based on the obtained similarity being less than the second threshold value, identify the error occurrence level as a second warning level higher than the first warning level.

2. The apparatus of claim 1, wherein the processor is configured to identify the target time interval and the standard time interval by a unit of a predetermined time, respectively, and identify the number of error occurrences in each time unit to obtain information on frequency information for each number of error occurrences in the target time interval and in the standard time interval, respectively.

3. The apparatus of claim 1, wherein the processor is configured to apply an algorithm to the frequency information for each number of error occurrences with respect to the target time interval and the frequency information for each number of error occurrences with respect to the standard time interval, and obtain a similarity between the error occurrence distribution in the target time interval and the error occurrence distribution in the standard time interval.

4. The apparatus of claim 3, wherein the algorithm is at least one of Mann-Whitney test or Kruskal-Wallis test.

5. The apparatus of claim 1, further comprising:
a communicator,
wherein the processor is configured to provide feedback information with respect to the obtained error occurrence level to the external electronic apparatus through the communicator.

6. The apparatus of claim 5, wherein the feedback information with respect to the error occurrence level comprises at least one of information on the target time interval, the error occurrence level in the target time interval, or hardware or software related to the error occurrence level.

7. A control method of an electronic apparatus comprising:
obtaining first error-related information of an external electronic apparatus with respect to a target time interval and second error-related information of the external electronic apparatus with respect to a standard time interval that is longer than the target time interval, the standard time interval including the target time interval and a time interval adjacent to the target time interval;
obtaining frequency information for each number of error occurrences with respect to the target time interval based on the first error-related information and frequency information for each number of error occurrences with respect to the standard time interval based on the second error-related information; and
identifying an error occurrence level with respect to the target time interval by comparing the frequency information for each number of error occurrences with respect to the target time interval with the frequency information for each number of error occurrences with respect to the standard time interval,
wherein the identifying the error occurrence level comprises obtaining a similarity between an error occurrence distribution in the target time interval and an error occurrence distribution in the standard time interval based on the frequency information for each number of error occurrences with respect to the target time interval and the frequency information for each number of error occurrences with respect to the standard time interval, and identifying the error occurrence level based on the obtained similarity, and
wherein the identifying the error occurrence level based on the obtained similarity comprises, based on the obtained similarity being equal to or greater than a first threshold value, identifying the error occurrence level as a stable level, based on the obtained similarity being less than the first threshold value and being equal to or greater than a second threshold value, identifying the error occurrence level as a first warning level, and based on the obtained similarity being less than the second threshold value, identifying the error occurrence level as a second warning level higher than the first warning level.

8. The method of claim 7, wherein the obtaining the frequency information comprises identifying the target time interval and the standard time interval by a unit of a predetermined time, respectively, and identifying the number of error occurrences in each time unit to obtain information on frequency information for each number of error occurrences in the target time interval and in the standard time interval, respectively.

9. The method of claim 7, wherein the identifying the error occurrence level further comprises applying an algorithm to the frequency information for each number of error occurrences with respect to the target time interval and the frequency information for each number of error occurrences with respect to the standard time interval, and obtaining a similarity between the error occurrence distribution in the target time interval and the error occurrence distribution in the standard time interval.

10. The method of claim 9, wherein the algorithm is at least one of Mann-Whitney test or Kruskal-Wallis test.

11. The method of claim 7, further comprising:
providing feedback information with respect to the obtained error occurrence level to the external electronic apparatus.

* * * * *